United States Patent [19]

Wideman et al.

[11] Patent Number: 5,120,798
[45] Date of Patent: Jun. 9, 1992

[54] ENHANCING THE CURE RATE OF A RUBBER BY USING HYDROFORMYLATED CARBON BLACK

[75] Inventors: Lawson G. Wideman, Tallmadge; Thomas J. Botzman, Stow, both of Ohio

[73] Assignee: The Goodyear Tire & Rubber Company, Akron, Ohio

[21] Appl. No.: 475,519

[22] Filed: Feb. 6, 1990

Related U.S. Application Data

[62] Division of Ser. No. 244,233, Sep. 14, 1988, Pat. No. 4,929,280.

[51] Int. Cl.$^5$ .............................. C08C 19/20
[52] U.S. Cl. .................. 525/343; 524/496; 525/351
[58] Field of Search ............ 525/343, 351, 354

[56] References Cited

U.S. PATENT DOCUMENTS

| | | | |
|---|---|---|---|
| 3,347,632 | 10/1967 | Parker | 106/472 |
| 3,408,165 | 10/1968 | Hinson, Jr. | 106/472 |
| 3,573,241 | 3/1971 | Gotshall | 106/472 |
| 3,676,256 | 7/1972 | Abuytes | 525/343 |
| 3,773,536 | 11/1973 | Batten et al. | 106/472 |
| 3,826,776 | 7/1974 | Wright . | |
| 3,909,281 | 9/1975 | Yamawaki et al. | 106/472 |
| 3,966,487 | 6/1976 | Crane et al. | 423/461 |
| 3,978,019 | 8/1976 | Oelmann et al. | 106/472 |
| 4,138,420 | 2/1979 | Unruh et al. | 568/454 |
| 4,248,802 | 2/1981 | Kuntz | 568/454 |
| 4,871,880 | 10/1989 | Omatsu et al. | 568/454 |

Primary Examiner—Christopher Henderson
Attorney, Agent, or Firm—Bruce J. Hendricks

[57] ABSTRACT

There is disclosed a process for hydroformylation of carbon black. The carbon black is hydroformylated by reacting carbon black with carbon monoxide and hydrogen under hydroformylation conditions in the presence of a hydroformylation catalyst and organic reaction solvent. Addition of the hydroformylated carbon black enhances the rates of cure of sulfur vulcanizable rubber.

15 Claims, No Drawings

ENHANCING THE CURE RATE OF A RUBBER BY USING HYDROFORMYLATED CARBON BLACK

This is a divisional of application Ser. No. 07/244,233, filed on Sep. 14, 1988, and issued as U.S. Pat. No. 4,929,280.

FIELD OF THE INVENTION

The present invention relates to the hydroformylation of carbon black. More particularly, the present invention relates to a process for making hydroformylated carbon black that is useful for enhancing the rate of cure of sulfur vulcanizable rubber.

DESCRIPTION OF THE PRIOR ART

The use of fillers in rubber is almost as old as the use of rubber itself. The Amazon Indians in Spanish times were known to use black powder in the rubber latex probably to improve light aging. The main reason for the predominant use of fillers, particularly carbon black, is the reinforcement they impart to the vulcanizates. It is known that fillers may influence the crosslinking reaction in rubber, for example, the retardation in cure by channel blacks as compared to furnace blacks. It is believed that the cause of this retardation can be traced to the greater or lesser acidity of the carbon black which influences the kinetics of the crosslinking reaction. Thus, the slurry pH of a channel black is 4–4.5 and that of a furnace black may range from about 7-9.

The "rate of cure" is the rate at which crosslinking and the development of the stiffness (modulus) of the compound occur after the scorch point. As the compound is heated past the scorch point, the properties of the compound change from a soft plastic to a tough elastic material required for use. During the curing step, crosslinks are introduced, which connect the long polymer chains of the rubber together. As more crosslinks are introduced, the polymer chains become more firmly connected and the stiffness or modulus of the compound increases. The rate of cure is an important vulcanization parameter since it in part determines the time the compound must be cured, i.e., the "cure time". In the manufacture of vulcanized rubber articles, significant cost savings can be realized through a reduction of time the article is required to spend in the mold. Through enhanced rates of cure, the mold time required to meet minimum "states of cure" can be reduced.

Given the above, extensive research has been conducted in order to shorten the rates of cure of rubbers. Therefore, there exists a need for a rubber additive which enhances cure in the absence of imparting undesirable properties to the vulcanizate.

SUMMARY OF THE INVENTION

The present invention relates to a process for the hydroformylation of carbon black comprising reacting carbon black with carbon monoxide and hydrogen under hydroformylation conditions in the presence of a hydroformylation catalyst and organic reaction solvent. In addition, there is disclosed a hydroformylated carbon black which is useful for enhancing the rate of cure of sulfur vulcanizable rubber.

DETAILED DESCRIPTION OF THE INVENTION

The present invention relates to a new and novel composition which can be prepared by the hydroformylation of carbon black. For the purposes of description herein, the terms "hydroformylated carbon black" and "oxo carbon black" are used interchangeably and are to be understood to be the product of carbon black which has been subjected to hydroformylation conditions in the presence of a hydroformylation catalyst, organic solvent and hydrogen and carbon monoxide. Suitable carbon blacks which have been found useful in the present invention may be prepared by the thermal process. In the thermal process, natural gas impinges on hot brick work and decomposes thermally into hydrogen and carbon. Carbon blacks made by the oil furnace process may also be used. In the oil furnace process, the main source of carbon is a heavy aromatic tar oil, and the gas is used as an auxiliary fuel to obtain the necessary high temperature. The main types of carbon black are known as FEF (fast extruding furnace having a particle size about 40 nanometers and a surface area of about 40 square meters per gram), HAF (high abrasion furnace having a particle size of about 28 nanometers and a surface area of about 65-70 square meters per gram), SAF (superior abrasion furnace having a particle size of about 19 nanometers and a surface area of approximately 110 to about 120 square meters per gram) and ISAF (intermediate superior abrasion furnace having a particle size of about 23 nanometers and a surface area of approximately 100 square meters per gram). Any of these types of carbon black may be used in the present invention. According to ASTM D-2516-6A, a number system for classifying the particle size of carbon black is recommended in which only the first number has meaning; so 0 as the first digit means particle size 1-10 nanometers; 1 as the first digit means particle size 11-19 nanometers; 2 means a size of 20-25 nanometers; 3 means 26-30 nanometers; 4 means 31-39 nanometers; 5 means 40-48 nanometers; 6 means 49-60 nanometers; 7 means 61-100 nanometers; 8 means 101-200 nanometers; and 9 means 101-500 nanometers. Any of the above carbon blacks may be used and in particular, those carbon blacks having a particle size ranging from about 10 to about 500 are preferred. A particularly preferred particle size for the carbon black for use in the present invention ranges from about 20 to about 100.

The carbon black is subjected to hydroformylation conditions while in the presence of a mixed gas composed of carbon monoxide and hydrogen. Such gas is commonly known as water gas, syngas or oxo gas. The relative amounts of carbon monoxide and hydrogen which are initially present in the feed gas to the reactor may be varied over a wide range. In general, the mole ratio of carbon monoxide to hydrogen is in the range of between about 30:1 to about 1:30, preferably between about 15:1 and about 1:15 and most preferably between about 10:1 to about 1:10. It is to be understood, however, that molar ratios outside the stated broad range may be employed. In addition to hydrogen and carbon monoxide, other gases may be contained in the feed gas so long as they do not or are not present in sufficient amounts to detrimentally affect the hydroformylation reaction.

An organic solvent is used to suspend the carbon black and dissolve the hydroformylation catalyst. The solvent is preferably inert to the hydroformylation reaction. Illustrative of solvents suitable for use in the practice of this invention include: saturated and aromatic hydrocarbons, e.g., hexane, octane, dodecane, naphtha, decalin, tetrahydronaphthalene, kerosene, mineral oil, cyclohexane, cycloheptane, alkyl cycloalkane, benzene, toluene, xylene, alkyl-naphthalene, and the like; ethers such as tetrahydrofuran, tetrahydropyran, diethylether, 1,2-dimethoxybenzene, 1,2-diethoxybenzene, the mono- and dialkylethers of ethylene glycol, propylene glycol, butylene glycol, diethylene glycol, dipropylene glycol, oxyethyleneoxypropylene .glycol, and the like; fluorinated hydrocarbons that are inert under the reaction conditions such as perfluoroethane, monofluorobenzene, and the like. Another class of solvents are sulfones such as dimethylsulfone, diethylsulfone, diphenolsulfone, sulfolane, and the like. Mixtures of the aforementioned solvents may be employed so long as they are compatible with each other under the conditions of the reaction and will adequately provide the sufficient suspension of the carbon black and dissolve the hydroformylation catalyst and not interfere with the hydroformylation reaction.

The hydroformylation of the carbon black is conducted in the presence of a hydroformylation catalyst. Conventional hydroformylation catalysts may be used including Group VIII Noble metal-triarylphosphine complex catalysts. Group VIII Noble metal-triarylphosphine complex catalysts are prepared using Group VIII Noble metal compounds, for example, hydrides, halides, carboxylates, nitrates or sulfates, etc. and triarylphosphine by known processes. When using this complex catalyst for the reaction, the complex may be previously prepared from the Group VIII Noble metal compound and triarylphosphine and introducing to the reaction system or the Group VIII Noble compound and the triarylphosphine may be supplied to the reaction system separately to form the complex in the reaction system. Examples of the Group VIII Noble metal compounds that can be used for preparing the complexes include ruthenium compounds such as ruthenium trichloride or tetraminoruthenium hydroxychloride, etc.; rhodium compounds such as rhodium dicarboxylchloride, rhodium nitrate, rhodium trichloride, rhodium acetate or rhodium sulfate, etc.; palladium compounds such as palladium hydride, palladium chloride, palladium iodide, palladium nitrate, palladium cyanide, palladium acetate or palladium sulfate, etc.; osmium compounds such as osmium trichloride or chloroosmic acid, etc.; iridium compounds such as iridium tribromide, iridium tetrabromide, iridium trifluoride, iridium trichloride or iridium carbonyl, etc.; and platinum compounds such as platinic acid, platinous iodide, sodium hexachloroplatinate, or potassium trichloromonoethyleneplatinate, etc. As the triarylphosphine ligand, triphenylphosphine is most suitably used. However, it is possible to use various triarylphosphines having substituents which are inactive with respect to the hydroformylation reaction, such as, for example, substituted triphenylphosphines having a lower alkyl group on the phenyl group such as tri-p-tolylphosphine, tri-m-tolylphosphine, trixylylphosphine or tris(p-ethylphenyl) phosphine, and substituted triphenylphosphines having an alkoxy group on the phenyl group such as tris(p-methoxyphenyl) phosphine, etc. As is known by those skilled in the art, tertiary phosphines such as triarylphosphine, etc. may be allowed, in general, to coexist in the reaction system in order to improve thermal stability of the complex catalyst. The amount of such coexistence can be in excess of ten times to several hundred times (e.g., about 10 to 900) as a molar ratio, based on the moles of the complex catalyst in the reaction system. Other than the above, the hydroformylation catalyst may be a cobalt compound soluble in the reaction mixture. Particularly preferred cobalt compounds include cobalt hydrocarbonyls or cobalt carbonyls such as dicobalt octacarbonyl. Cobalt carbonyl may be prepared in situ by reaction of the syngas on various cobalt salts.

The amount of catalyst that is generally present may range from a concentration of from about 0.01 to about 2.0% by weight of the reaction mixture. Preferably, the hydroformylation catalyst will range from about 0.05 to about 0.5% by weight of the reaction mixture.

The hydroformylation can be effected over a wide temperature rang from moderate to elevated temperature. In general, the hydroformylation reaction may be conducted at a temperature of between about 50° C. to about 400° C. In most cases, when operating at the lower end of the temperature range, it is desirable to utilize pressures at the higher end of the range. The preferred temperature range is from about 90° C. to about 140° C., while the most preferred temperature range is from about 100 to about 120.

The hydroformylation reaction is effected under superatmospheric pressure conditions. The pressure is produced by the hydrogen and carbon monoxide containing gas provided to the reactor. Pressures between 10 psig to about 2500 psig may be used to conduct the hydroformylation reaction. In the preferred embodiment, the hydroformylation reaction is conducted at a pressure range of from about 50 to about 250 psig. In addition to the partial pressures exerted by carbon monoxide and hydrogen, a partial pressure will be exerted by any inert gases that may be present in the syngas.

The process of this invention is effected for a period of time sufficient to produce the desired hydroformylated carbon black. In general, the reaction time can vary from minutes to several hours. If the more sluggish reaction conditions are selected, then the reaction time will have to be extended until the desired product is produced. It is appreciated that the residence time of the carbon black will be influenced by the reaction temperature, concentration and choice of catalyst, total gas pressure, partial pressure exerted by its components, concentration and choice of solvent, and other factors. Desirably, the hydroformylation reaction is conducted until such time as from about 0.1% to about 5% psig of the carbon black is functionalized. Preferably, the reaction is conducted until such time as from about 1% to about 2% of the carbon black is functionalized.

The process for the hydroformylation of carbon black may be carried out in a batch, semi-continuous or continuous manner. The hydroformylation reaction may be conducted in a single reaction zone or in a plurality of reaction zones, in series or in parallel. The reaction may be conducted intermittently or continuously in an elongated tubular zone or in a series of such zones. The material of construction of the equipment should be such as to be inert during the reaction. The equipment should also be able to withstand the reaction temperatures and pressures. The reaction zone can be fitted with internal and/or external heat exchangers to control undo temperature fluctuations, or to prevent possible run-away reaction temperatures caused by the possible exothermic nature of the reaction. Preferably, an agitation means is available to ensure complete suspension of the carbon black in the solvent. Mixing induced by vibration, shaker, stirrer, rotating, oscillation, etc. are all illustrative of the types of agitation means which are contemplated for use in the present invention. Such agitation means ar available and well known to those skilled in the art.

The hydroformylated carbon blacks enhance the rates of cure or vulcanization of sulfur vulcanizable elastomers. The term "rubber" or "elastomer" as used herein embraces both natural rubber and all its various raw and reclaim forms as well as various synthetic rubbers. Representative synthetic polymers are the homopolymerization products of butadiene and its homologues and derivatives, as for example, methylbutadiene, dimethylbutadiene and pentadiene as well as copolymers such as those formed from butadiene or its homologues or derivatives with other unsaturated organic compounds. Among the latter are acetylene e.g. vinyl acetylene; olefins, for example, isobutylene, which copolymerizes with isoprene to form butyl rubber; vinyl compounds, for example vinylchloride, acrylic acid, acrylonitrile (which polymerize with butadiene to form buna-N rubber), methacrylic acid and styrene, the latter compound polymerizing with butadiene to form Buna-S rubber, as well as vinyl esters and various unsaturated aldehydes, ketones and ethers, e.g., acrolein, methyl isopropenyl ketone and vinylethyl ether. Also included are the various synthetic rubbers prepared by the homopolymerization of isoprene and the copolymerization of isoprene with other diolefins and various unsaturated organic compounds. Additionally, included are the synthetic rubbers such as 1,4-cis polybutadiene and 1,4-cis polyisoprene and similar synthetic rubbers such as EPDM. The preferred rubbers for use with the hydroformylated carbon black are polybutadiene, polybutadiene-styrene copolymers and polyisoprene.

The hydroformylated carbon black may be used in a wide variety of proportions of the rubber which may be as a substitute, in whole or part for conventional carbon black. In addition, the hydroformylated carbon black may be a supplement to conventional carbon black. Generally, the level of hydroformylated carbon black that may be added to the rubber may range from about 1 phr (parts per hundred rubber) to about 150 phr. Preferably the amount of hydroformylated rubber that is added ranges from about 20 phr to about 60 phr.

The hydroformylated carbon blacks may be used with any conventional compounding additives such as zinc oxide, antidegradants, processing oils, waxes, accelerators, sulfur vulcanizing agents and fatty acids. For the purposes of this invention, "sulfur vulcanizing agents" mean elemental sulfur or sulfur donating vulcanizing agents, for example, an amine disulfide or a polymeric polysulfide. Preferably, the hydroformylated carbon black is used with free sulfur.

The following examples are presented in order to illustrate but not limit the present invention.

EXAMPLES 1–8

Preparation of 1% Oxo Carbon Blacks

A series of oxo carbon blacks were prepared using the following procedure. A one liter stainless steel autoclave was swept with nitrogen gas and charged with 50 g of pelletized carbon black, 600 ml hexane and 100 mg of Co(CO) dissolved in 20 ml hexane. The reactor was swept with a syngas ($H_2$-CO mixture in a 1:1 molar ratio). The reactor was heated with stirring under about 100 psig of syngas to 120° C., followed by adjustment of the reactor pressure to 200 psig. The reaction was allowed to continue for two hours, cooled, and vented. The resulting carbon black/hexane suspension was suction filtered, washed, and air dried at 70° C. to constant weight.

The above procedure was used to prepare oxo carbon blacks from carbon black A (N-220 having an iodine number surface area of 121 and a DBP structure of 115), carbon black B (general purpose tread having an iodine number surface area of 109 and a DBP structure of 124), carbon black C (N-121 having an iodine number surface area of 121 and a DBP structure of 132) and carbon black D (improved ISAF-high structure N-220 having an iodine number surface area of 122 and a DBP structure of 114). The values for the iodine number surface area was determined in accordance with ASTM D 1510. The values for the DBP structure was determined in accordance with ASTM D 2414.

Sample Mixing and Testing

A series of rubber compounds were made using the recipe listed in Table I below. As for the carbon black component, either a carbon black control (samples 1a–c, 3a–c, 5a–c and 7a–c) or oxo black (samples 2a–c, 4a–c, 6a–c and 8a–c) was used. The compounds were mixed using a standard two pass mix on a 55 g lab brabender mixer.

Cure testing was performed at 150° C. on a Monsanto cure rheometer. Samples for modulus and autovibron testing were cured to TC90 plus ten minute mold lag as measured on the rheometer. Modulus samples were measured in triplicate. The data from the testing is listed in the tables below.

TABLE I

| Ingredients | Amount (phr) |
| --- | --- |
| Nonproductive | |
| High vinyl polybutadiene (65% vinyl) | 75 |
| Synthetic 1,4-polyisoprene | 25 |
| Carbon black | 45 |
| Processing Oil | 9 |
| Antidegradant | 3 |
| Wax | 1 |
| Stearic acid | 3 |
| Zinc oxide | 3 |
| Total | 164 |
| Productive | |
| Nonproductive | 164 |
| Accelerator | 1.2 |
| Sulfur | 1.6 |
| Total | 167 |

| Example | Description | Table |
| --- | --- | --- |
| 1a | Carbon black A (Control) | II |
| 1b | Carbon black A (Control) | II |
| 1c | Carbon black A (Control) | II |
| 2a | Oxo carbon black A | II |
| 2b | Oxo carbon black A | II |
| 2c | Oxo carbon black A | II |
| 3a | Carbon black B (Control) | III |
| 3b | Carbon black B (Control) | III |
| 3c | Carbon black B (Control) | III |
| 4a | Oxo carbon black B | III |
| 4b | Oxo carbon black B | III |
| 4c | Oxo carbon black B | III |
| 5a | Carbon black C (Control) | IV |
| 5b | Carbon black C (Control) | IV |
| 5c | Carbon black C (Control) | IV |
| 6a | Oxo carbon black C | IV |
| 6b | Oxo carbon black C | IV |
| 6c | Oxo carbon black C | IV |
| 7a | Carbon black D (Control) | V |
| 7b | Carbon black D (Control) | V |
| 7c | Carbon black D (Control) | V |
| 8a | Oxo carbon black D | V |
| 8b | Oxo carbon black D | V |
| 8c | Oxo carbon black D | V |

TABLE II

| Example | 1a | 1b | 1c | 2a | 2b | 2c |
|---|---|---|---|---|---|---|
| Modulus 100% | 1.52 | 1.45 | 1.57 | 1.31 | 1.43 | 1.49 |
| Modulus 300% | 7.21 | 7.36 | 7.45 | 6.05 | 6.11 | 6.79 |
| Tensile | 15.94 | 15.89 | 12.75 | 9.27 | 15.48 | 18.47 |
| Elongation | 510 | 500 | 450 | 400 | 520 | 600 |
| Tan Delta 0° C. | 0.185 | | | 0.184 | | |
| Tan Delta 60° C. | 0.103 | | | 0.106 | | |
| Maximum Torque | 36.4 | | | 36.8 | | |
| Minimum Torque | 8.6 | | | 9.5 | | |
| t 90 | 24.3 | | | 23.5 | | |
| t 25 | 13.0 | | | 11.7 | | |
| Delta T2 | 10.5 | | | 9.4 | | |

TABLE III

| Example | 3a | 3b | 3c | 4a | 4b | 4c |
|---|---|---|---|---|---|---|
| Modulus 100% | 1.73 | 1.89 | 1.75 | 1.99 | 1.93 | 1.93 |
| Modulus 300% | 8.44 | 9.06 | 8.54 | 9.15 | 8.67 | 9.05 |
| Tensile | 19.20 | 15.66 | 18.83 | 13.92 | 16.57 | 14.26 |
| Elongation | 505 | 430 | 500 | 405 | 460 | 405 |
| Tan Delta 0° C. | 0.178 | | | 0.179 | | |
| Tan Delta 60° C. | 0.101 | | | 0.111 | | |
| Maximum Torque | 37.6 | | | 39.4 | | |
| Minimum Torque | 9.6 | | | 10.3 | | |
| t 90 | 21.0 | | | 17.2 | | |
| t 25 | 8.1 | | | 7.6 | | |
| Delta T2 | 6.4 | | | 6.0 | | |

TABLE IV

| Example | 5a | 5b | 5c | 6a | 6b | 6c |
|---|---|---|---|---|---|---|
| Modulus 100% | 3.17 | 3.25 | 2.48 | 2.87 | 2.73 | 2.36 |
| Modulus 300% | 12.87 | 13.89 | 11.98 | 11.81 | 12.28 | 11.79 |
| Tensile | 14.65 | 14.20 | 15.70 | 14.37 | 13.25 | 13.60 |
| Elongation | 320 | 305 | 360 | 340 | 310 | 330 |
| Tan Delta 0° C. | 0.163 | | | 0.166 | | |
| Tan Delta 60° C. | 0.094 | | | 0.092 | | |
| Maximum Torque | 40.7 | | | 40.5 | | |
| Minimum Torque | 11.2 | | | 11.6 | | |
| t 90 | 27.4 | | | 22.5 | | |
| t 25 | 12.0 | | | 11.8 | | |
| Delta T2 | 11.4 | | | 9.1 | | |

TABLE V

| Example | 7a | 7b | 7c | 8a | 8b | 8c |
|---|---|---|---|---|---|---|
| Modulus 100% | 2.39 | 2.35 | 2.36 | 2.33 | 2.38 | 2.24 |
| Modulus 300% | 10.36 | 11.35 | 10.04 | 9.92 | 10.32 | 9.51 |
| Tensile | 14.14 | 13.50 | 14.96 | 15.08 | 13.69 | 11.94 |
| Elongation | 380 | 330 | 400 | 400 | 370 | 360 |
| Tan Delta 0° C. | 0.188 | | | 0.176 | | |
| Tan Delta 60° C. | 0.111 | | | 0.112 | | |
| Maximum Torque | 37.5 | | | 37.8 | | |
| Minimum Torque | 10.1 | | | 10.6 | | |
| Torque t 90 | 27.1 | | | 22.5 | | |
| t 25 | 15.2 | | | 12.6 | | |
| Delta T2 | 12.1 | | | 10.0 | | |

As can be seen from Tables II–V, the values for t 25 (time required to achieve 25% of the ultimate modulus observed for the compound on the rheometer), t 90 (time required to achieve 90% of the ultimate modulus observed for the compound on the rheometer) and Delta T2 (time for a 2 point rise on the rheometer) are consistently lower for the compounds containing oxo carbon black versus the carbon black control. In addition, the remaining data in the tables demonstrate that the incorporation of an oxo carbon black does not have a detrimental effect on other physical properties.

EXAMPLES 9-18

Preparation of 1% Oxo Carbon Blacks

Another series of oxo carbon blacks were prepared using the following procedure. A one liter stainless steel autoclave was charged with 50 g of pelletized carbon black, 600 ml of hexane and 400 mg of Co(CO) predissolved in 20 ml of hexane. The reactor was swept with nitrogen gas and then swept three times with syngas ($H_2$-CO mixture in a 1:1 molar ratio). The reactor with about 110 psig of syngas was heated with stirring to 120° C. and 200 psig total pressure for two hours. The carbon black pellets became powdered during the course of the reaction. The resulting carbon black/hexane suspension was suction filtered and air dried at 70° C.

The above procedure was used to prepare oxo carbon blacks from carbon black A, carbon black B, carbon black D and carbon black E (N-550 having an iodine number surface area of 43 and a DBT structure of 121).

Sample Mixing and Testing

A series of rubber compounds were made using the recipe listed above in Table I. As part of the rubber compound, either a carbon black control (not hydroformylated) or an oxo carbon black was used. The compounds were mixed using a standard two pass mix on a 55 g lab brabender mixer.

Cure testing was performed at 150° C. on a Monsanto cure rheometer. The data from the cure testing is listed below.

| Example | Description |
|---|---|
| 9 | Carbon black A (Control) |
| 10 | Oxo carbon black A |
| 11 | Carbon black B (Control) |
| 12 | Oxo carbon black B |
| 13 | Carbon black E (Control) |
| 14 | Oxo carbon black E |
| 15 | Carbon black D (Control) |
| 16 | Oxo carbon black D |
| 17 | Carbon black C (Control) |
| 18 | Oxo carbon black C |

TABLE VI

| Example | t 90 | t 25 | Delta T2 |
|---|---|---|---|
| 9 (Control) | 24.3 | 13.0 | 10.5 |
| 10 | 23.5 | 11.7 | 9.4 |
| 11 (Control) | 21.0 | 8.1 | 6.4 |
| 12 | 17.2 | 7.6 | 6.0 |

TABLE VI-continued

| Example | t 90 | t 25 | Delta T2 |
|---|---|---|---|
| 13 (Control) | 21.6 | 11.9 | 9.6 |
| 14 | 20.7 | 10.6 | 8.6 |
| 15 (Control) | 27.1 | 15.2 | 12.1 |
| 16 | 22.5 | 12.6 | 10.0 |
| 17 (Control) | 27.4 | 12.0 | 11.4 |
| 18 | 22.5 | 11.8 | 9.1 |

As indicated in Table VI, use of each oxo carbon black yielded lower t 90, t 25 and Delta T2 values versus the carbon black control. It can also be appreciated that the beneficial results from using an oxo black does not appear to be conditioned upon any one particular type of carbon black.

EXAMPLES 19-21

In order to demonstrate that the hydroformylation catalyst is not contributing to the cure enhancing properties of the hydroformylated carbon blacks, a comparison was conducted. The composition of Example 19 was the rubber composition of Table I with the nonhydroformylated carbon black A. The composition of Example 20 was the composition of Example 19 plus 100 mg of Co(CO) catalyst. The composition of Example 20 was the composition of Example 19 plus 400 mg of Co(CO) catalyst. The data listed in Table VII below reveals that the presence of cobalt hydroformylation catalyst does not enhance cure rates and is in fact detrimental to the curing rates of the rubber compound of Table I.

TABLE VII

| Example | t 90 | t 25 | Delta T2 |
|---|---|---|---|
| 19 | 24.3 | 13.0 | 10.5 |
| 20 | 24.8 | 13.0 | 10.2 |
| 21 | 26.2 | 13.8 | 10.5 |

EXAMPLE 22

40 g of HAF carbon black (N-220) was ground to a fine powder with a mortar and pestle. The powdered carbon black was added to 600 ml of hexane and 110 mg of $HRhCO(PPh_3)_3$ catalyst dissolved in 20 ml of toluene. The entire reaction mixture was charged into a one liter stainless steel autoclave under an atmosphere of nitrogen. The nitrogen atmosphere was replaced with a hydrogen-carbon monoxide (2 to 1) atmosphere. The reactor was heated to 100° C. with stirring under a hydrogen-carbon monoxide pressure of 184 psig. After ½ hours of reaction time, 1 psig of hydrogen-carbon monoxide gas had been consumed. The resulting carbon black/hexane suspension was suction filtered and air dried.

EXAMPLE 23

The procedure and conditions of Example 22 were repeated except the reaction temperature was 120° C., the hydrogen-carbon monoxide pressure was 195 psig and the reaction time was one hour. Five psig of hydrogen-carbon monoxide gas had been consumed.

Many modifications may be made in the process of this invention by those skilled in the art without departing from the spirit and scope thereof which is defined only by the appended claims.

What is claimed is:

1. A method for enhancing the rate of cure of a sulfur vulcanizable rubber comprising adding to said rubber an effective amount of hydroformylated carbon black wherein said hydroformylated carbon black is prepared according to a process comprising reacting carbon black with a gas consisting essentially of carbon monoxide and hydrogen under hydroformylation conditions in the presence of a hydroformylation catalyst and organic reaction solvent.

2. The method of claim 1 wherein said hydroformylation catalyst and the carbon black is suspended in the organic solvent.

3. The method of claim 1 wherein said hydroformylation catalyst is dissolved in the organic solvent.

4. The method of claim 1 wherein said catalyst is a cobalt containing compound.

5. The method of claim 1 wherein said catalyst is a Group VIII Noble metal-triarylphosphine complex and the Group VIII Noble metal is selected from the group consisting of ruthenium, rhodium, palladium, osmium, iridium and platinum.

6. The method of claim 5 wherein the triarylphosphine ligand that is used to prepare the Group VIII Noble metal-triarylphosphine complex is selected from the group consisting of triphenylphosphine, tri-p-tolylphosphine, tri-m-tolylphosphine, trixylylphosphine, tris(p-ethylphenyl) phosphine and tris(p-methoxyphenyl) phosphine.

7. The method of claim 4 wherein the cobalt containing compound is selected from the group consisting of a cobalt carbonyl or cobalt hydrocarbonyl.

8. The method of claim 1 wherein the organic solvent is inert to the hydroformylation reaction conditions.

9. The method of claim 1 wherein the solvent is selected from the group consisting of saturated hydrocarbons, aromatic hydrocarbons, ethers, fluorinated hydrocarbons, and sulfones.

10. The method of claim 1 wherein the solvent is selected from the group consisting of hexane, octane, dodecane, naphtha, decalin, tetrahydronaphthalene, kerosene, mineral oil, cyclohexane, cycloheptane, alkyl cycloalkane, benzene, toluene, xylene, alkyl-naphthalene, tetrahydrofuran, tetrahydropyran, diethylether, 1,2-dimethoxybenzene, 1,2-diethoxybenzene, the mono- and dialkyl ethers of ethylene glycol, the mono- and dialkyl ethers of propylene glycol, the mono- and dialkyl ethers of butylene glycol, the mono- and dialkyl ethers of diethylene glycol, the mono- and dialkyl ethers of dipropylene glycol, the mono- and dialkyl ethers of oxyethyleneoxypropylene glycol, perfluoroethane, monofluorobenzene, dimethylsulfone, diethylsulfone, diphenyl sulfone, and sulfolane.

11. The method of claim 1 wherein the carbon black is a type selected from the group consisting of FEF, HAF, SAF, and ISAF.

12. The method of claim 1 wherein the carbon black has a particle size ranging from about 10 nanometers to about 500 nanometers.

13. The method of claim 1 wherein the reaction is conducted at a temperature ranging from about 50° C. to about 400° C.

14. A method according to claim 1 wherein from about 1 to about 150 phr of hydroformylated carbon black is added to the sulfur vulcanizable rubber.

15. A method according to claim 1 wherein the sulfur vulcanizable rubber is selected from the group consisting of polybutadiene, polyisoprene, styrene/butadiene copolymers, terpolymers of acrylonitrile, butadiene and styrene, and blends thereof.

* * * * *